3,156,477
  SPARK PLUG GASKET AND TOOL THEREFOR
Harold P. Hopp, 374 Lantana Ave., Englewood, N.J.
       Filed Aug. 19, 1963, Ser. No. 302,918
              1 Claim. (Cl. 277—236)

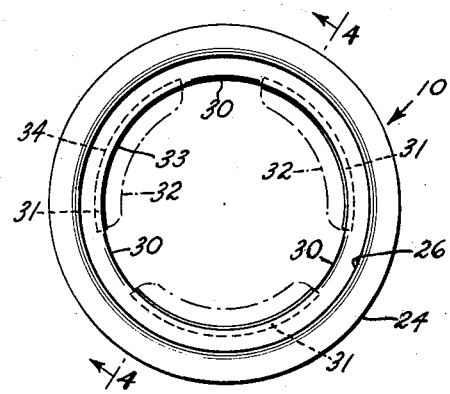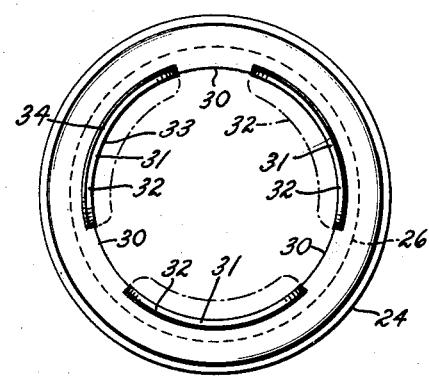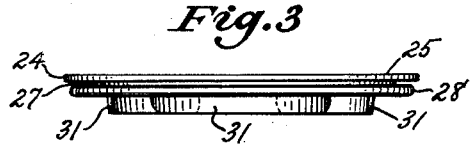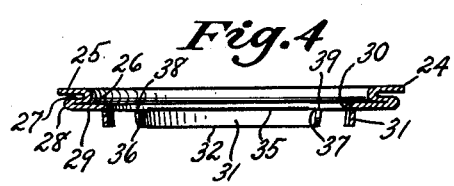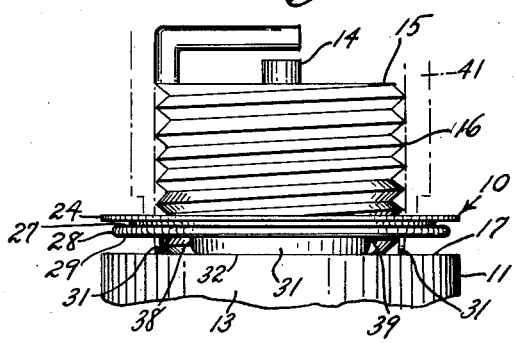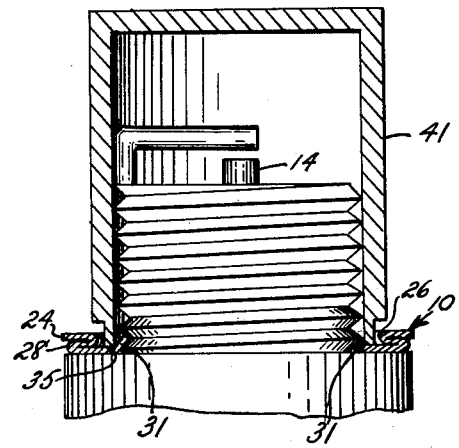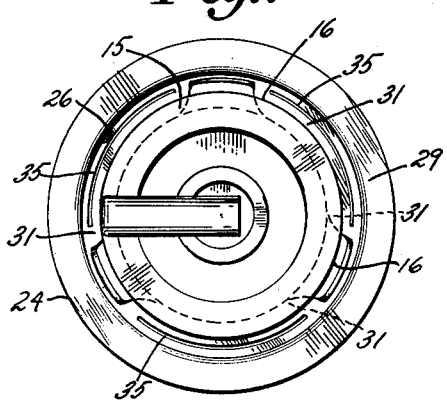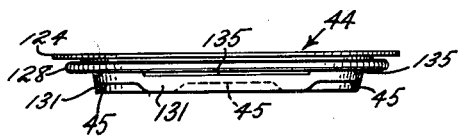

This invention relates generally to the field of sealing gaskets, and more particularly to an improved spark plug gasket of a lockable type.

Spark plug gaskets, in the prior art, have been of a deformable type, usually formed from copper or plated steel. In either case, the material is annealed after the gasket has been formed, so that when a spark plug is engaged within a cylinder head of an engine, the gasket is readily deformed under compression to effect a seal between the spark plug and the cylinder head. Upon removal of the spark plug for cleaning or replacement, the gasket has usually remained on the exposed surface of the cylinder head, necessitating separate removal before a new gasket may be employed to seal the replaced plug.

In recent years, the wide use of overhead valve-type internal combustion engines has made the replacement of spark plugs a far more difficult operation than has heretofore been the case. In many cases, the spark plug opening in the head is completely concealed from the view of the mechanic, so that the spark plug and attached gasket must be manually inserted blindly into the proper opening, using the fingers of one hand. Such operations have resulted in the loss of gaskets prior to engagement of the spark plug with the opening in the cylinder head, and in some instances, the replacement of the spark plug with a new gasket disposed upon an old one, so that the spark plug does not become properly seated within the combustion chamber.

Attempts have been made to provide so-called screw-on gaskets having projections or a continuous thread thereupon which permit the gasket to be threadedly engaged upon the lower cylindrical portion of the spark plug body, so that the same will remain in proper position during the engagement of the spark plug with the cylinder head. While such construction has been adequate to maintain the gasket upon the spark plug during such engagement, and is the only type of gasket which can be used where the plug body is threaded throughout the entire length of the lower shank portions, such gaskets have tended to remain in place on the cylinder head when the spark plug is unthreaded, owing to the cementitious action of rust, corrosion and the like, which normally occurs while the spark plug is in service. Such devices have an added disadvantage in that a separate operation, that of threading the gasket upon the plug, is necessary before the plug may be installed.

In my co-pending application for United States Letters Patent, Serial No. 116,858, now abandoned, filed June 13, 1961, and entitled Pressure Locked Spark Plug Gaskets, there is disclosed a gasket construction which may be slipped over the threaded shank of a spark plug prior to installation, and means for deforming a locking flange such that the same will engage the undercut area at the inner end of the threaded shank to permanently lock the gasket thereon and permit relative movement between the gasket and the plug body. Once so locked, the gasket will remain fixed to the plug, wherein the difficulties described hereinabove are substantially eliminated. The construction and method set forth in my co-pending application, require, however, the presence of an undercut portion into which the locking flange may be deformed. A large number of spark plugs presently in use are machined in such a manner that no undercut portion is present, and where it is desired to lock a gasket upon such a plug body, a different form of engagement is necessary.

It is therefore among the principal objects of the present invention to provide an improved locking gasket which may be conveniently installed upon a plug prior to installation, and which will remain firmly interconnected with the same throughout its useful life, and during the removal of the spark plug from a cylinder head.

Another object of the invention lies in the provision of an improved locking gasket possessed of the above advantages, which may be employed in conjunction with spark plug bodies which are not provided with a thread undercut along the threaded shank portion thereof.

Another object of the invention lies in the provision of an improved lockable spark plug gasket of the class described which is provided with an internal locking flange which may be deformed directly against the threaded portion of a spark plug body in such manner as to engage the threads so tightly that it is impossible thereafter to remove the gasket from the threaded portion of the plug body without resort to tools.

A further object of the invention lies in the provision of a lockable spark plug gasket of the glass described in which the above-mentioned distortion is confined solely to the locking flange portion thereof, so that the sealing elements thereof are completely unaffected prior to engagement of the spark plug within a cylinder head.

Yet another object of the invention lies in the provision of an improved lockable spark plug gasket, possessed of the above advantages, in which the locking flange is totally unaffected by subsequent distortion of the sealing portions of the gasket, or removal of the plug from installed condition with respect to a cylinder head opening.

A further object of the invention lies in the provision of an improved lockable spark plug gasket in which the cost of fabrication may be directly comparable with that of constructions presently existing in the art, thereby permitting consequent wide sale, distribution and use.

A feature of the invention lies in the fact that only a minute degree of mechanical distortion is necessary to engage the locking flange upon the threaded portion of a spark plug body, as contrasted with considerable distortion necessary in the case of prior art devices.

These objects and features, as well as other incidental ends and advantages, will more fully appear in the progress of the following disclosure, and be pointed out in the appended claim.

In the drawing, to which reference will be made in the similar reference characters have been employed to designate corresponding parts throughout the several views.

FIGURE 1 is a view in elevation of a first embodiment of the invention.

FIGURE 2 is a similar view in elevation of the first embodiment, showing the side opposite that seen in FIGURE 1.

FIGURE 3 is a view in elevation as might be seen from the bottom portion of FIGURE 1.

FIGURE 4 is a central longitudinal sectional view as seen from the plane 4—4 in FIGURE 1.

FIGURE 5 is a fragmentary view in elevtation showing a first step in the installation of the gasket upon a spark plug body.

FIGURE 6 is a view in elevation, partly in section, corresponding to a second step in the installation of the gasket.

FIGURE 7 is a view in elevation showing the gasket in installed condition upon the plug body.

FIGURE 8 is a view in elevation corresponding to that seen in FIGURE 3, but showing an alternate form of the first embodiment.

In accordance with the invention, the device, generally indicated by reference character 10, is shown in the drawing (FIGURES 5 and 6) in installed relation with a conventional spark plug 11, including a metallic body 12 forming an upper cylindrical member 13 in which an electrode 14 is mounted, and a lower threaded cylindrical member 15 having a continuous thread 16 engageable within a correspondingly threaded portion in a cylinder head (not shown). The thread 16 terminates at the inner portion thereof at a lower surface 17 of the cylindrical member 13, there being no tapered fillet or undercut portion, as is the case in my above-mentioned co-pending application, Serial No. 166,858.

The device 10 is preferably formed by progressive die stamping operations well-known in the art, and includes a sealing element 24 of annular configuration, the element 24 having a first sealing member 25, a first bend portion 26, a second sealing member 27, a second bend portion 28, and a third sealing member 29. During installation of the spark plug 11, the sealing element 24 will be compressed along a principal axis of compression to effect a seal between the metallic body 12 of the spark plug 11 and a cylinder head of an internal combustion engine.

Extending inwardly or centrally of the sealing area defined by the sealing element 24 is a third bend portion 30 supporting a plurality of locking flanges 31 of generally frusto-conically shaped configuration, as best seen in FIGURES 1 to 4, inclusive. Each of the flanges 31 is generally similar, including inner and outer surfaces 33 and 34, respectively, and first and second end interconnecting portions 36 and 37 refining a slot 35. A free edge 32 extends from points 38 to points 39. From a consideration of FIGURES 3, 4 and 7, it will be apparent that the locking flanges 31 are segmentally interconnected to permit ready deformation of the same relative to the third bend portion 30. Both the third bend portion 30 and the flanges 31 extend inwardly of the sealing area formed by the sealing element 24, and thus are not subject to distortion during installation of the plug 11 in a cylinder head. The taper angle of the locking flanges 31 with respect to the principal axis of compression of the device 10 may vary depending upon the degree of fit of the installed gasket upon the plug, but I have found a preferable range to lie within 5° to 7°. The inside diameter as measured between two oppositely disposed flanges 31 at the narrowest point is preferably sufficient to just clear the major axis of the threads 16 on the plug 11, so as to permit slidable engagement without the necessity of manually threading the device 10 on the thread 16. To install the device, the same is positioned such that the free edges of the locking flanges 31 lie upon the surface 17. While in this condition, a cylindrically-shaped tool 41 is moved axially with respect to the axis of the plug 11 to contact the bend portion 30 along an arc spaced from the thread 16. Owing to the initial close fit prior to distortion of the flanges 31, a very small degree of movement of the tool 41 will result in substantial inward displacement of the flanges 31 to move the same into the thread lands adjacent the surface 17. It will be observed that the identical distortion does not occur to each of the three flanges 31, but the ultimate distortion will depend upon the relative position of an individual thread, and the location of adjacent lands relative to the surface 17. The device 10 will now be permanently locked upon the plug 11 owing to a tight frictional fit, the same being removable only by resort to a gripping tool to enable forcible unthreading.

In installed condition, the plug may then be manually handled, installed or removed with respect to a cylinder head without fear of loss of the device 10, which cannot rotate independently therefrom, and which will remain permanently attached thereto. During the securing of the device 10 upon the plug 11, distortion of the flanges 31 by the tool 41 will result in a small degree of tool hardening of the metal forming the flanges 31, but this effect is not transmitted past the bend portion 30, and owing to the fact that both the bend portion 30 and the flanges 31 are disposed inwardly of the sealing area, the sealing element 24, including the sealing members 25, 27, and 29, remains in a relatively soft, highly annealed, condition to effect a complete seal without difficulty.

Referring to FIGURE 8, there is shown an alternate form of the first embodiment, in which parts corresponding to those of the principal embodiment have been designated by similar reference characters with the additional prefix "1". The alternate form, generally indicated by reference character 44, differs from the principal form in that the individual flanges 131 are interconnected by portions 45, the flanges 131 functioning in an identical manner during installation.

I wish it to be understood that I do not consider the invention limited to the precise details of structure shown and set forth in this specification, for obvious modifications will occur to those skilled in the art to which the invention pertains.

I claim:

In a compressible annular gasket having a principal axis of compression, a sealing element including at least one sealing member forming a generally annularly-shaped sealing area, a bend portion disposed centrally of said sealing area, and a locking flange connected to said bend portion, there being a plurality of slots extending through said bend portion to facilitate the inward flexing of said locking flange.

References Cited in the file of this patent

UNITED STATES PATENTS

| | | |
|---|---|---|
| 2,757,945 | Bingham | Aug. 7, 1956 |
| 3,012,802 | Waite | Dec. 12, 1961 |
| 3,029,084 | Gobb | Apr. 10, 1962 |
| 3,039,186 | Stoyer et al. | June 19, 1962 |
| 3,055,100 | Kimpel | Sept. 28, 1962 |
| 3,099,456 | Hopp | July 30, 1963 |